US009250988B2

(12) United States Patent
Adekile et al.

(10) Patent No.: US 9,250,988 B2
(45) Date of Patent: Feb. 2, 2016

(54) VIRTUALIZATION-BASED ENVIRONMENTS FOR PROBLEM RESOLUTION

(75) Inventors: Olusegun Adekile, Raleigh, NC (US); Christopher A. Maul, Wake Forest, NC (US); Asima Silva, Holden, MA (US); Cesar A. Wong, Cary, NC (US)

(73) Assignee: INTERNATIONAL BUSINESS MACHINES CORPORATED, Armonk, NY (US)

( * ) Notice: Subject to any disclaimer, the term of this patent is extended or adjusted under 35 U.S.C. 154(b) by 425 days.

(21) Appl. No.: 13/484,459

(22) Filed: May 31, 2012

(65) Prior Publication Data

US 2013/0326510 A1  Dec. 5, 2013

(51) Int. Cl.
G06F 11/00 (2006.01)
G06F 9/455 (2006.01)
G06F 11/07 (2006.01)

(52) U.S. Cl.
CPC ........ *G06F 11/0709* (2013.01); *G06F 11/0793* (2013.01); *G06F 9/455* (2013.01); *G06F 11/0712* (2013.01)

(58) Field of Classification Search
None
See application file for complete search history.

(56) References Cited

U.S. PATENT DOCUMENTS

| 6,598,179 | B1* | 7/2003 | Chirashnya et al. ............ 714/37 |
| 6,802,054 | B2 | 10/2004 | Faraj |
| 7,577,722 | B1 | 8/2009 | Khandekar et al. |
| 7,996,274 | B2 | 8/2011 | Barsness et al. |
| 8,578,217 | B2* | 11/2013 | Chen et al. ...................... 714/48 |
| 2006/0143617 | A1* | 6/2006 | Knauerhase et al. ......... 718/104 |
| 2009/0024994 | A1 | 1/2009 | Kannan et al. |
| 2009/0282404 | A1 | 11/2009 | Khandekar et al. |
| 2009/0300607 | A1 | 12/2009 | Ferris et al. |
| 2009/0307528 | A1* | 12/2009 | Byers .................... G06F 11/366 714/32 |
| 2010/0088150 | A1 | 4/2010 | Mazhar et al. |
| 2010/0313200 | A1 | 12/2010 | Rozee et al. |
| 2011/0010691 | A1 | 1/2011 | Lu et al. |
| 2012/0131577 | A1* | 5/2012 | Arcese et al. ..................... 718/1 |
| 2012/0144236 | A1* | 6/2012 | Black et al. ..................... 714/25 |
| 2012/0239596 | A1* | 9/2012 | Lee et al. ........................ 706/11 |
| 2013/0138812 | A1* | 5/2013 | Assuncao ................. G06F 9/50 709/226 |
| 2013/0139128 | A1* | 5/2013 | Jones et al. .................... 717/128 |
| 2013/0227551 | A1* | 8/2013 | Tsirkin ............................ 718/1 |

OTHER PUBLICATIONS

Arnold, M. et al.; QVM: An Efficient Runtime for Detecting Defects in Deployed Systems; ACM SIGPLAN Notices; vol. 43, No. 10, pp. 143-162; Oct. 2008.

Wang, K. et al.; Rethink the Virtual Machine Template; ACM SIGPLAN Notices; VEE '11; vol. 46, Issue 7; pp. 39-49; Jul. 2011.

(Continued)

*Primary Examiner* — Abdullah Al Kawsar
(74) *Attorney, Agent, or Firm* — James L. Baudino (57) ABSTRACT

According to one aspect of the present disclosure a method and technique for allocating virtualization-based resources for resolving a problem report associated with a computing environment is disclosed. The method includes: receiving a problem report associated with a computing environment; determining a resource template from the problem report corresponding to the computing environment; determining whether a virtual machine is available from a virtualization-based resource pool based on the resource template; and responsive to determining that a virtual machine is available from the virtualization-based resource pool based on the resource template, utilizing the virtual machine for the problem report.

14 Claims, 6 Drawing Sheets

(56) References Cited

OTHER PUBLICATIONS

Sotomayor, B. et al.; Overhead Matters: A Model for Virtual Resource Management; Virtualization Technology in Distributed Computing (VTDC 2006); pp. 1-8; 2006.

Maddison, A; Virtualization management Tools & Strategies—Enterprise-wide Management Platforms Meet Best-of-breed Tools; Virtualization Review (Internet website: http://virtualizationreview.com/articles/2010/05/01/virtualization-management-tools-and-strategies.aspx); May 1, 2010.

* cited by examiner

VIRTUALIZATION-BASED ENVIRONMENTS FOR PROBLEM RESOLUTION

BACKGROUND

Computer-related help desks or assistance centers oftentimes include various service levels to assist a customer/consumer with a computing issue or problem. For example, a customer/consumer may have a problem with loading/installing software or utilizing the software. The customer/consumer may also be experiencing errors or unexpected/unanticipated results with the execution or running of the software program/application. The customer/consumer may be able to contact the help desk or assistance center or otherwise submit a request to seek assistance in resolving the problem. Depending on the nature and/or severity of the problem, the root cause of the problem may not be readily ascertainable without reproducing the problem/issue. Reproducing the problem/issue may include creating an environment (or even multiple environments) to ascertain the scope of the issue/problem.

BRIEF SUMMARY

According to one aspect of the present disclosure a method and technique for utilizing virtualization-based resources in a cloud or other type of computing environment to re-create a computing environment for computer-related problem evaluation/resolution is disclosed. The method includes: receiving a problem report associated with a computing environment; determining a resource template from the problem report corresponding to the computing environment; determining whether a virtual machine is available from a virtualization-based resource pool based on the resource template; and responsive to determining that a virtual machine is available from the virtualization-based resource pool based on the resource template, utilizing the virtual machine for the problem report.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a method, system and computer program product for utilizing virtualization-based resources in a cloud or other type of computing environment to re-create a computing environment for computer-related problem evaluation/resolution. For example, in some embodiments, the method and technique includes: receiving a problem report associated with a computing environment; determining a resource template from the problem report corresponding to the computing environment; determining whether a virtual machine is available from a virtualization-based resource pool based on the resource template; and responsive to determining that a virtual machine is available from the virtualization-based resource pool based on the resource template, utilizing the virtual machine for the problem report. Thus, embodiments of the present disclosure enable virtualization-based cloud computing resources to be used for replicating a computing environment for evaluating and/or resolving a computer-related problem. Embodiments of the present disclosure reduce the time needed to re-create a problem or issue by creating computing environments matching a computing environment of the entity having the problem/issue using virtualization-based or cloud computing resources. Further, embodiments of the present disclosure enable various computer-related attributes of a client/customer computing environment to be analyzed to determine which resources may be omitted and/or replaced/substituted with other resources (e.g., resources that are current available) that will satisfactorily replicate the client/customer computing environment for problem/issue evaluation and resolution.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 1:
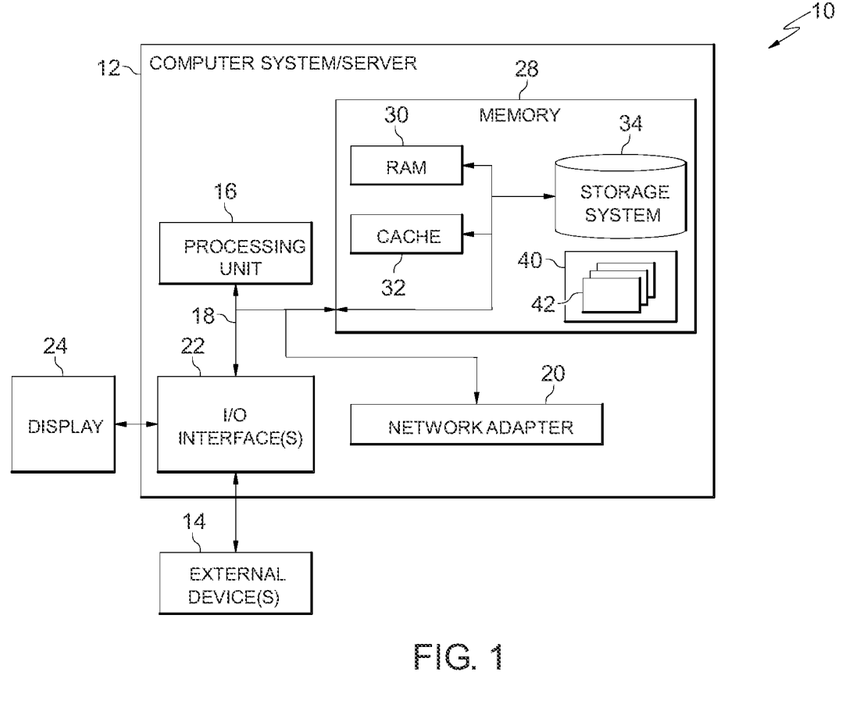
FIG. 1 depicts a cloud computing node according to an embodiment of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
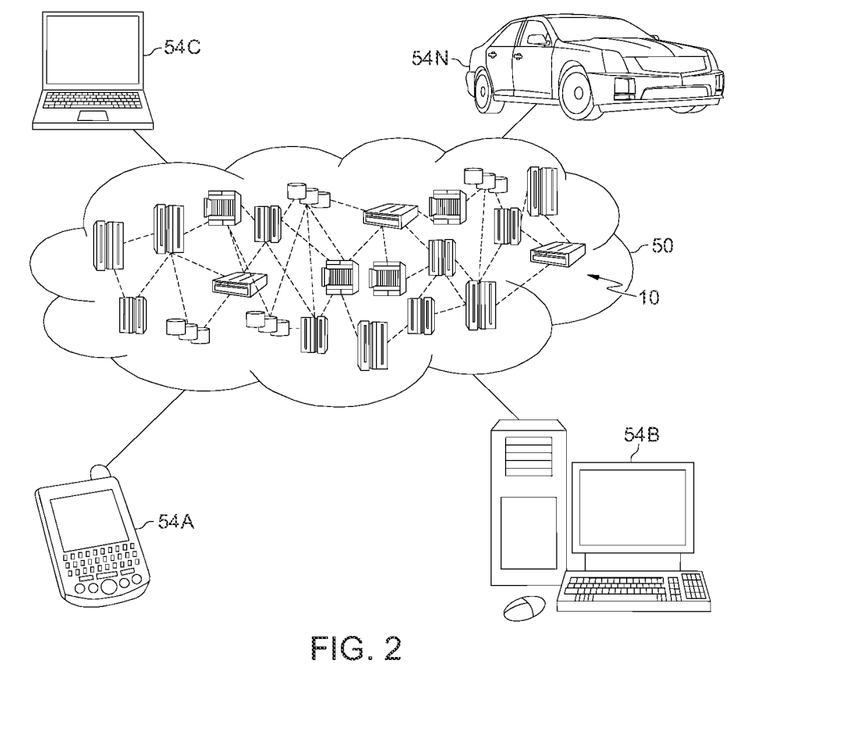
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another.

They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
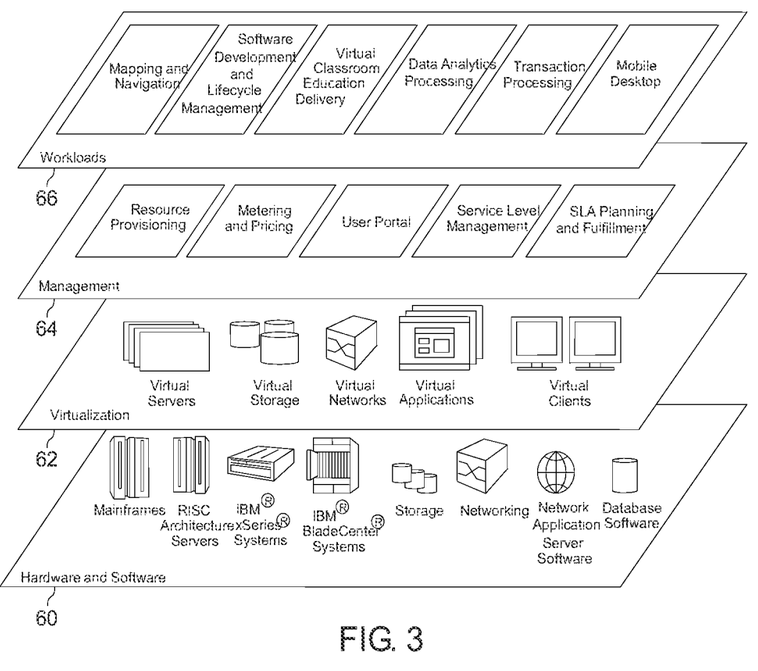
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual machines, including virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Service level management may also include virtual machine allocation and management such that the migration and/or execution of virtual machine resources (e.g., various workload or application processing) complies with the geophysical host location.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop functions.

Figure 4:
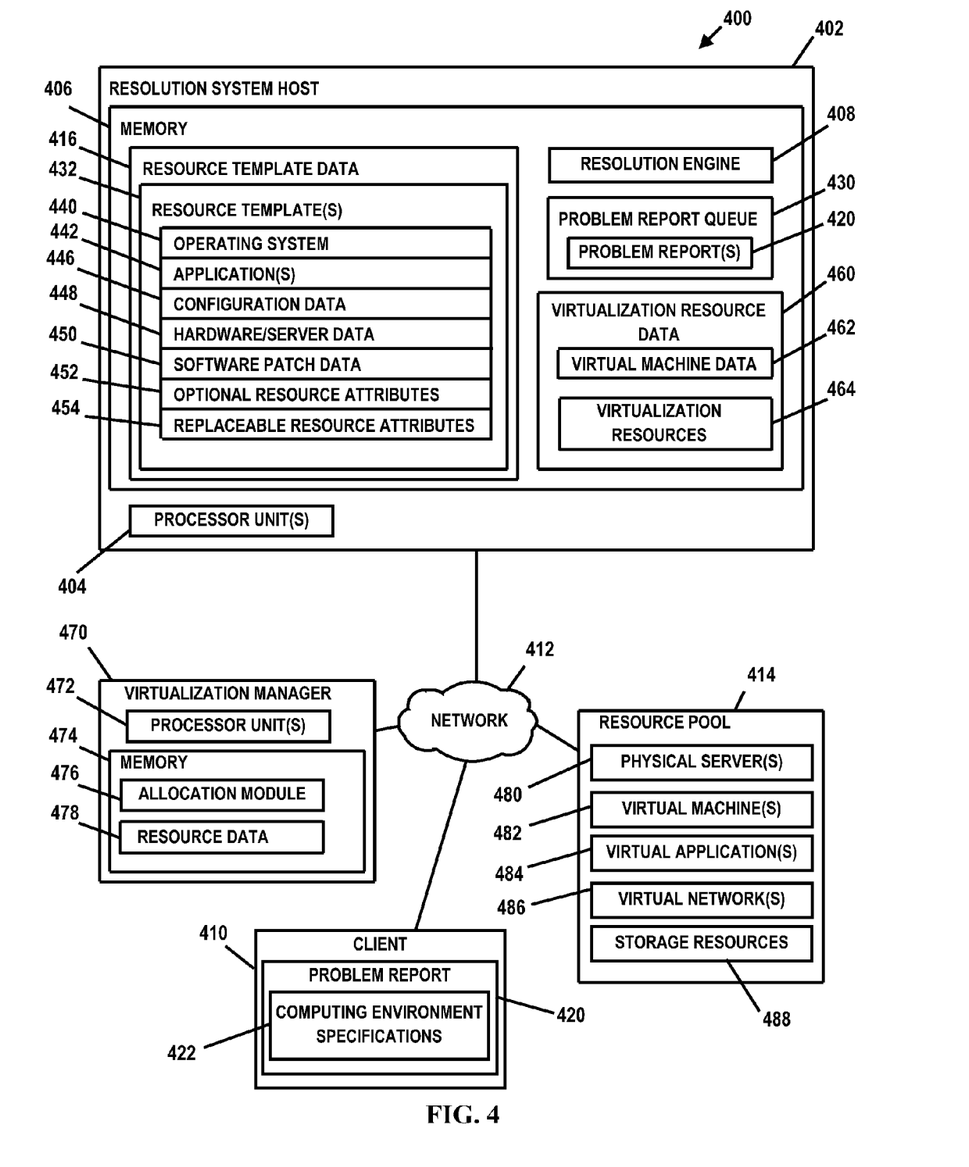
FIG. 4 depicts an embodiment of a data processing system in which illustrative embodiments of a system for utilizing virtualization-based environments for problem resolution may be implemented according to the present disclosure.

FIG. 4 is an illustrative embodiment of a virtualization-based problem resolution system 400 for utilizing virtualization-based resources in a cloud or other type of computing environment to re-create a computing environment for computer-related problem evaluation/resolution. System 400 may be implemented on data processing systems or platforms such as, but not limited to, node 10 or at other data processing system locations. System 400 (e.g., all or portions thereof) may be implemented, for example, on hardware and software layer 60 and/or on management layer 64 as depicted in FIG. 3. In the embodiment illustrated in FIG. 4, system 400 comprises a resolution system host 402 comprising a physical computer or any type of data processing platform. Host 402 includes one or more processor units 404 (e.g., CPU) capable of reading and executing instructions and/or running a variety of types of applications and a memory 406. In FIG. 4, memory 406 comprises a resolution engine 408 for evaluating a problem report received from a client 410, dynamically determining and/or allocating virtualization-based resources in a cloud or other type of computing environment for re-creating or replicating a computing environment of client 410, and using the re-create virtualization-based environment for problem evaluation/resolution. For example, in FIG. 4, host 402 can communicate over a network 412 to dynamically allocate (e.g., an on-demand allocation) for various types of computing resources described and/or made available via a resource pool 414. Resource pool 414 may include a variety of types of computing resources such as, but not limited to, storage resources, memory resources, processing power resources, networking resources and virtual machines. A virtual machine is a virtual sharing or partitioning of computer resources. For example, the virtually partitioned resources may include one or more processors, memory, storage, network cards, etc. Each virtual machine may run its own instance of an operating system and may run one or more applications on its operating system. Resolution engine 408 may be implemented in any suitable manner that may be hardware-based, software-based, or some combination of both. For example, resolution engine 408 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the embodiment illustrated in FIG. 4, memory 406 also comprises resource template data 416 comprising information associated with a computing environment of client 410. For example, in response to experiencing a software-related or other type of computing environment problem, client 410 may create and/or generate a problem report 420 specifying various parameters and/or attributes corresponding to the problem, including various types of computing environment specifications 422. Computing environment specifications 422 may comprise information associated with the various hardware and/or software components corresponding to a computing or machine environment within which client 410 is experiencing a problem. Client 410 may communicate and/or otherwise transmit problem report 420 via network 412 to system 400, where system 400 may store and/or otherwise locate problem report 420 in a problem report queue 430.

In response to receiving a problem report 420, resolution engine 408 analyzes problem report 420 and generates a resource template 432 from computing environment specifications 422 identified in problem report 420. Resource template 432 comprises a representation of the computing environment 422 of client 410. For example, in some embodiments, resolution engine 408 analyzes computing environment specifications 422 from problem report 420 to determine machine environment attributes of the computing environment of client 410 such as, but not limited to, an operating system 440 (e.g., type, version, etc.), one or more applications 442 (e.g., an application related to a particular problem and/or applications running concurrently within the computing environment of client 410), configuration data 446 corresponding to various software and/or hardware components of the computing environment of client 410 (e.g., firmware versions, application versions, hardware configuration settings, etc.), hardware/server data 448 (e.g., type, model, version, etc.), and software patch data 450 (e.g., patches, revisions, updates or other software-related aspects). However, it should be understood that additional and/or alternate types of computing environment information may be provided in and/or derived from computing environment specifications 422 to enable resolution engine 408 to determine a computing environment in which client 410 is experiencing a problem to facilitate a re-creation of such computing environment for problem resolution.

In some embodiments, resolution engine 408 may also determine and/or otherwise identify optional resource attributes 452 and replaceable resource attributes 454 for a particular resource template 432 corresponding to a computing or machine environment of client 410. For example, in some embodiments, various hardware and/or software resources in the computing environment of client 410 may not be needed for a re-create environment for problem resolution. Such optional resource attributes 452 may be identified and omitted, if necessary or desired, when provisioning virtualization-based resources for re-creating the computing environment of client 410 (e.g., one or more applications 442 and/or one or more hardware resources). Replaceable resource attributes 454 may comprise various computing environment resources that may be replaced with other computing environment resources for purposes of re-creating a computing environment corresponding to client 410. For example, even though computing environment specifications 422 may identify a particular server resource in the computing environment of client 410, the particular server resource may be replaceable without impact (or with negligible impact) for re-creating the problem environment corresponding to client 410.

In the embodiment illustrated in FIG. 4, memory 406 also comprises virtualization resource data 460. Virtualization resource data 460 comprises information associated with various virtualization-based resources that may be provisioned and/or otherwise allocated by resolution engine 408 for re-creating a computing environment corresponding to the computing environment of client 410 to resolve problem report 420. In the illustrated embodiment, virtualization resource data 460 includes virtual machine data 462 and virtualization resources 464. Virtual machine data 462 may comprise information associated with one or more reusable virtual machines that are available in resource pool 414 that may be used as the re-creation environment for resolving problem report 420. Virtualization resources 464 may comprise information associated with various other types of virtualization-based resources available from resource pool 414 that may be provisioned and/or allocated to a re-creation environment corresponding to the computing environment of client 410. For example, if a virtual machine corresponding to a particular resource template 432 is unavailable or nonexistent in resource pool 414, virtualization resources 464 may include information associated with various types of virtualization-based resources that may be utilized to create a desired virtual machine and/or otherwise be allocated for re-creating the computing environment of client 410.

In FIG. 4, system 400 also includes a virtualization manager 470. Virtualization manager 470 may comprise an Internet-based and/or web-based interface accessible by host 400 via network 412 for identifying and/or provisioning various virtualization-based resources for re-creating the computing environment of client 410 for problem report 420 resolution. In the illustrated embodiment, virtualization manager 470 includes one or more processor units 472 and a memory 474. Memory 474 includes an allocation module 476 and resource data 478. Allocation module 476 may be used to select and/or otherwise allocate various virtualization-based resources to the re-create environment from resource pool 414. For example, allocation module 476 may be implemented in any suitable manner that may be hardware-based, software-based, or some combination of both. For example, allocation module 476 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). Resource data 478 may comprise information associated with the various virtualization-based resources available in resource pool 414. For example, in FIG. 4, resource pool 414 includes various types of computing resources such as physical servers 480, virtual machines 482, virtual applications 484, virtual networks 486, and storage resources 488. It should be understood that resource pool 414 may comprise additional and/or different types of computing resources besides those illustrated in FIG. 4. In some embodiments, host 402 may interface with virtualization manager 470 to acquire virtualization resource data 460 such as virtual machine data 462 corresponding to virtual machines 482 available or residing in resource pool 414 and virtualization resources 464 corresponding to other types of virtualization-based resources available in resource pool 414.

In operation, in response to receiving problem report 420, resolution engine 408 analyzes problem report 420, including computing environment specifications 422, and derives and/or otherwise generates a resource template 432 representing a computing environment of client 410. The particular resource template 432 generally represents the computing environment of client 410 needed to re-create the issue or problem identified in problem report 420. As indicated above, the particular resource template 432 may identify a particular operating system 440, one or more applications 442, various types of configuration data 446, hardware/server data 448 and/or software patch data 450 or other types of computing environment or resource attributes related to the computing environment of client 410. After creating resource template 432, resolution engine 408 accesses virtualization resource data 460 to determine whether a virtual machine 482 residing in resource pool 414 matches (matches or substantially matches) the resources corresponding to resource template 432. For example, resolution engine 408 may access virtual machine data 462 which may identify and/or otherwise specify one or more existing or reusable virtual machines 482 residing in resource pool 414 that may be used for the re-create environment corresponding to client 410. If so, resolution engine 408 allocates the corresponding virtual machine 482 for providing an environment for re-creating the problem of problem report 420.

If a particular virtual machine 482 matching resource template 432 is unavailable or nonexistent in resource pool 414, resolution engine 408 may determine which computing environment resources of client 410 are optional such that certain computing environment resources may be omitted from the re-creation environment for the purposes of problem resolution. For example, depending on the particular type of problem indicated in problem report 420, the particular computing environment resources comprising the computing environment of client 410, and/or other factors, certain computing environment resources may be unnecessary for purposes of creating a computing environment for resolving a problem indicated by problem report 420. Resolution engine 408 may determine and/or otherwise identify optional resource attributes 452 corresponding to resource template 432 and determine whether a virtual machine 482 is available from resource pool 414 based on such optional resource attributes 452. For example, if optional resource attributes 452 indicate that certain applications and/or hardware elements are optional, resolution engine 408 may omit such optional resource attributes 452 when attempting to identify a virtual machine 482 in resource pool 414 matching resource template 432 (i.e., a virtual machine 482 that may match or may be a suitable option for the non-optional resource attributes of resource template 432). If resolution engine 408 identifies a particular virtual machine 482 available in resource pool 414 that is a suitable candidate for a re-creation of the computing environment of client 410 based on omitting certain resource attributes, resolution engine 408 allocates the corresponding virtual machine 482 for the environment for problem resolution.

Resolution engine 408 may also determine and/or otherwise identify replaceable resource attributes 454 corresponding to the computing environment of client 410. For example, as indicated above, various computing environment resources associated with the computing environment of client 410 may be replaceable with alternate computing resources without impact (or negligible impact) when re-creating the computing environment of client 410 for problem resolution. Thus, for example, if a particular virtual machine 482 matching resource template 432 is unavailable or nonexistent within resource pool 414, resolution engine 408 may determine if certain resources in resource template 432 may be replaced based on replaceable resource attributes 454. If so, resolution engine 408 may then evaluate virtual machines 482 within resource pool 414 based on certain replaced resource attributes to determine a matching or suitable candidate virtual machine 482 for re-creating the computing environment of client 410. If replacing certain resource attributes of resource template 432 results in the location or identification of a virtual machine 482 within resource pool 414 that is a suitable candidate for re-creating the computing environment of client 410, resolution engine 408 allocates the corresponding virtual machine 482 for problem resolution.

In some embodiments, if a particular virtual machine 482 is unavailable or nonexistent within resource pool 414 corresponding to resource template 432 (even after considering optional resource attributes 452 and/or replaceable resource attributes 454), resolution engine 408 may access virtualization resources 464 to determine the availability of various virtualization-based resources of resource pool 414 that may be allocated and/or used to create a desired virtual machine 482. Resolution engine 408 may then allocate the identified virtualization-based resources of resource pool 414 and/or otherwise create, or cause to be created, a virtual machine 482 including the computing environment attributes needed to re-create the computing environment of client 410. If the virtualization-based resources needed to create a particular virtual machine and/or otherwise allocate corresponding to resource template 432 are unavailable in resource pool 414, resolution engine 408 and/or virtualization manager 470 may update resource pool 414 with additional virtualization-based resources as needed based on the particular resource template 432. The created virtual machine 482 is then allocated or provisioned to problem resolution.

Resolution engine 408 may also analyze problem report 420 to determine whether or when to initialize the virtualization-based resources and, for example, on which server to initialize the virtualization-based resources for client 410 computing environment re-creation or replication. For example, information within problem report 420 may indicate the severity, age, or other attributes that may affect the provisioning of virtualization-based resources to problem resolution. Resolution engine 408 may evaluate the virtualization-based resources for system load, the availability of shared resources, the availability or use of virtualization-based resources for other problem reports 420, or other criteria. Resolution engine 408 may then initialize the virtualization-based resources when available or, if the criticality of the problem report 420 so dictates, resolution engine 408 may suspend or re-allocate various virtualization-based resources currently active for a certain problem report 420 for resolving a different problem report 420.

Upon problem resolution of a particular problem report 420, the virtualization-based resources allocated to the problem report 420 may be released or freed up for other use. In some embodiments, if a virtual machine 482 was created by resolution engine 408 to meet a particular resource template 432, resolution engine 480 may analyze the created virtual machine 482 for its applicability or reusability for other problem reports 420 (or future problem reports 420). If resolution engine 480 determines that the created virtual machine 482 has applicability or reusability for other problem reports 420, the created virtual machine 482 may be added to or remain configured as a virtual machine 482 within resource pool 414 (instead of releasing the various virtualization-based resources making up the created virtual machine 482 for other uses).

Figure 5:
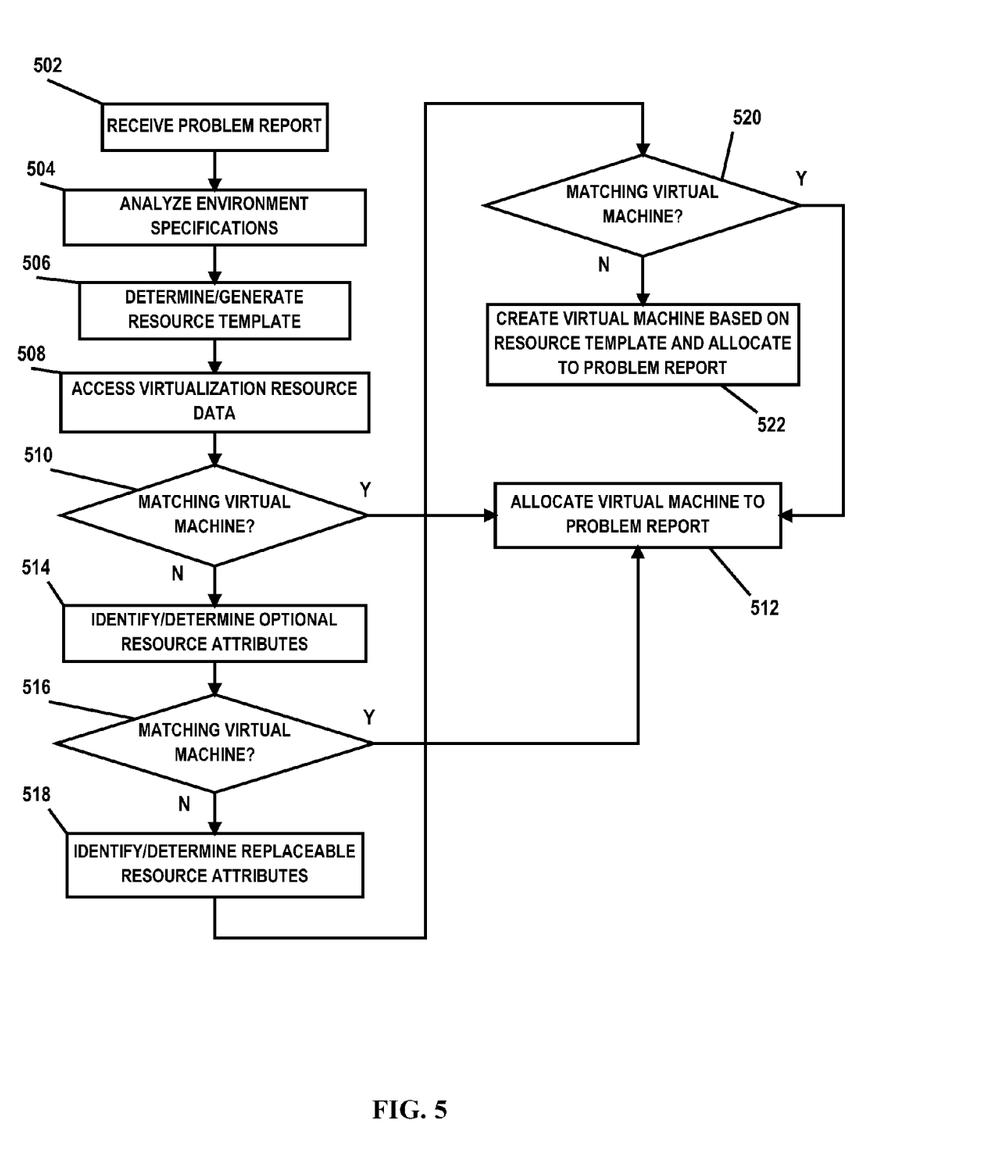
FIG. 5 depicts a flow diagram illustrating an embodiment of a method for utilizing virtualization-based environments for problem resolution according to the present disclosure.

FIG. 5 is a flow diagram illustrating an embodiment of a method for utilizing virtualization-based resources in a cloud or other type of computing environment to re-create a computing environment for problem resolution. The method begins at block 502, where host 402 and resolution engine 408 receive problem report 420 from client 410. At block 504, resolution engine 408 analyzes problem report 420 and computing environment specifications 422 included in problem report 420. At block 506, resolution engine 408 determines and/or otherwise generates resource template 432 from problem report 420 representing a computing environment of client 410 in which a computer-related problem has occurred. Resource template 432 includes various shooting environment attributes corresponding to a computing environment of client 410 and may also specify computing environment resources that are optional (e.g., optional resource attributes 452) and computing environment resources that may be replaceable with alternate computing environment resources (e.g., replaceable resource attributes 454).

At block 508, resolution engine 408 accesses virtualization resource data 460 to determine and/or otherwise identify available virtualization-based resources for re-creating a computing environment corresponding to client 410 based on resource template 432 to determine a cause and/or resolution to the problem indicated in problem report 420. At decisional block 510, a determination is made by resolution engine 408 whether a virtual machine 482 is available in virtualization-based resource pool 414 matching resource template 432 (e.g., a virtual machine 482 having characteristics and/or attributes corresponding to a computing environment of client 410 in which client 410 is experiencing a computer-related problem). If a virtual machine 482 exists and/or is otherwise available from resource pool 414, the method proceeds to block 512 where resolution engine 408 assigns and/or otherwise allocates the identified virtual machine 482 as the environment for evaluating and/or resolving the problem indicated in problem report 420. If a virtual machine 482 matching (matching or substantially matching) the computing environment attributes corresponding to resource template 432 is nonexistent and/or unavailable from resource pool 414, the method proceeds from decisional block 510 to block 514.

At block 514, resolution engine 408 identifies and/or otherwise determines optional resource attributes 452 4 resource template 432. At decisional block 516, a determination is made whether a virtual machine 482 exists and/or is otherwise available from resource pool 414 having computing environment resource attributes corresponding to resource template 432 except for optional resource attributes 452. If so, the method proceeds to block 512 where resolution engine 408 selects and/or otherwise assigns the identified virtual machine 482 as the environment for evaluating and/or resolving the problem indicated in problem report 420. If not, the method proceeds from decisional block 516 to block 518, where resolution engine 408 identifies and/or otherwise determines replaceable resource attributes 454 for resource template 432. At decisional block 520, resolution engine 408 determines whether a virtual machine 482 exists and/or is otherwise available from resource pool 414 corresponding to resource template 432 having certain computing environment resources replaced with other/alternate computing resources based on replaceable resource attributes 454. If so, the method proceeds to block 512 where resolution engine 408 selects and/or otherwise assigns the identified virtual machine 482 as the environment for evaluating and/or resolving the problem indicated in problem report 420.

If at decisional block 520 it is determined that a virtual machine 482 is nonexistent and/or unavailable in resource pool 414 as a suitable candidate as a computing environment for re-creating the computer-related problem of problem report 420, the method proceeds to block 522 where resolution engine 408 evaluates various virtualization-based resources of resource pool 414 and creates or otherwise causes the creation of a virtual machine 482 having computing environment attributes or characteristics corresponding to resource template 432. In some embodiments, based on available virtualization-based resources within resource pool 414, resolution engine 408 may take into consideration optional resource attributes 452 and/or replaceable resource attributes 454 for determining the particular aspects of a virtual machine to create for replicating the computing environment of client 410. Resolution engine 408 may also request that additional computing environment resources be added to resource pool 414 to accommodate a particular resource template 432.

Figure 6:
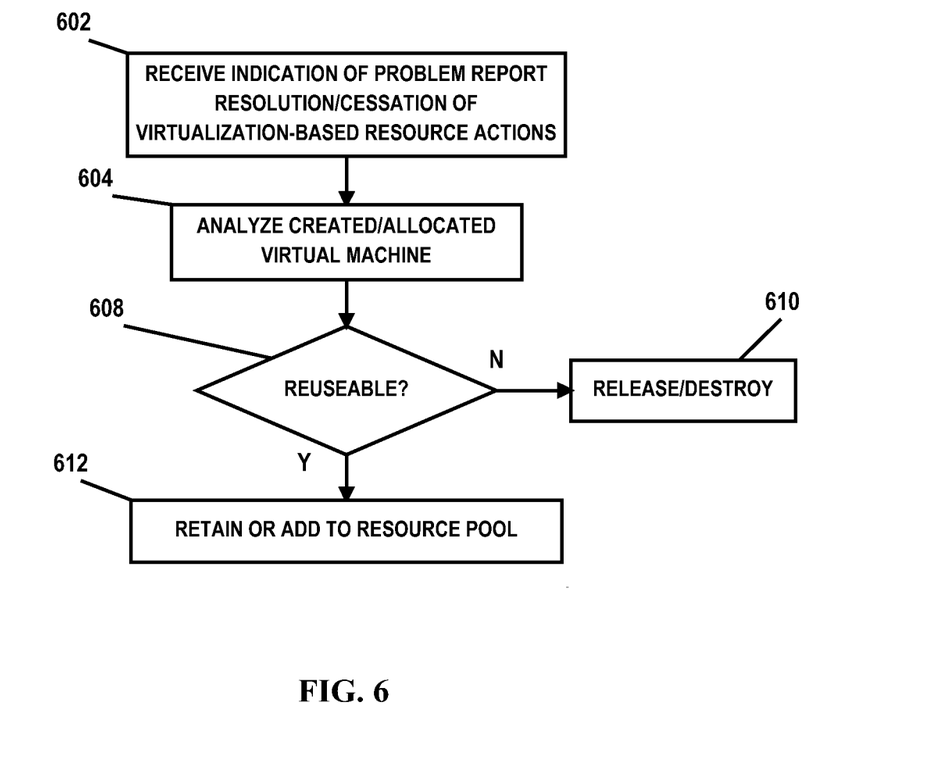
FIG. 6 depicts a flow diagram illustrating another embodiment of a method for utilizing virtualization-based environments for problem resolution according to the present disclosure.

FIG. 6 is a flow diagram illustrating another embodiment of a method for utilizing virtualization-based resources in a cloud or other type of computing environment to re-create a computing environment for problem resolution. The method begins at block 602, where resolution engine 408 receives an indication of problem report 420 resolution or cessation of computer related actions corresponding to problem report 420 resolution using virtualization-based resources. At block 604, resolution engine 408 analyzes the particular virtual machine 482 created and/or otherwise allocated for replicating the computing environment of client 410 for evaluating and/or resolving problem report 420. At decisional block 608, a determination is made by resolution engine 408 whether the created and/or allocated virtual machine 482 is a reusable virtual machine 482. For example, various factors may be considered whether the created and/or allocated virtual machine 482 may have computing environment characteristics and/or attributes usable for replicating other client 410 computing environments or for other purposes. If not, the method proceeds to block 610, where the particular virtual machine 482 may be released/destroyed and/or the virtualization-based resources otherwise made available within resource pool 414 for other uses. If it is determined that the created and/or allocated virtual machine 482 is reusable, the method proceeds from decisional block 608 to block 612, wherein the virtual machine 482 is retained in and/or added to resource pool 414 for selecting and/or otherwise allocating to other problem reports 420.

Thus, embodiments of the present disclosure enable virtualization-based cloud computing resources to be used for replicating a computing environment for evaluating and/or resolving a computer-related problem. For example, in some embodiments, the present disclosure manages and controls various virtualization-based resources for replicating a computing environment in which an entity is experiencing a computer-related problem. Embodiments of the present disclosure reduce the time needed to re-create a problem or issue by creating computing environments matching a computing environment of the entity having the problem/issue using virtualization-based or cloud computing resources. Further, embodiments of the present disclosure enable various computer-related attributes of a client/customer computing environment to be analyzed to determine which resources may be omitted and/or replaced/substituted with other resources (e.g., resources that are current available) that will satisfactorily replicate the client/customer computing environment for problem/issue evaluation and resolution. Additionally, embodiments of the present disclosure enable businesses/entities without the needed infrastructure or software to fully ascertain the nature or scope of a problem to utilize virtualization-based or cloud computing resources to replicate a needed computing environment for problem evaluation/resolution in less time and at less cost.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   receiving a problem report associated with a computing environment;
   determining a resource template from the problem report corresponding to the computing environment;
   determining whether a virtual machine is available from a virtualization-based resource pool based on the resource template;
   responsive to determining that a virtual machine is not available from the virtualization-based resource pool based on the resource template, identifying optional resource attributes based on the problem report, the optional resource attributes indicating resources of the computing environment unnecessary for resolving a problem indicated by the problem report;
   determining whether a virtual machine is available from the virtualization-based resource pool without the optional resource attributes;
   responsive to determining that a virtual machine is available from the virtualization-based resource pool based on the resource template without the optional resource attributes, utilizing the virtual machine as a re-create environment for resolving the problem report;
   determining whether to start the virtual machine based on an age and a severity of a problem indicated by the problem report; and
   responsive to the severity of the problem indicated by the problem report, suspending or re-allocating various virtualization-based resources currently active for resolving a different problem report if enough resources are not available to start the virtual machine for the problem report.

2. The method of claim 1, further comprising, responsive to determining that a virtual machine is not available from the virtualization-based resource pool based on the resource template:
   identifying replaceable resource attributes of the resource template; and
   determining whether a virtual machine is available from the virtualization-based resource pool based on the replaceable resource attributes.

3. The method of claim 1, further comprising, responsive to determining that a virtual machine is not available from the virtualization-based resource pool based on the resource template:
   determining whether the virtualization-based resource pool comprises resources corresponding to the resource template; and
   responsive to determining that the virtualization-based resource pool comprises resources corresponding to the resource template, creating a virtual machine from the virtualization-based resource pool based on the resource template.

4. The method of claim 3, further comprising:
   responsive to resolving the problem report, determining whether the created virtual machine comprises a reusable virtual machine; and
   responsive to determining that the created virtual machine comprises a reusable virtual machine, adding the created virtual machine to the virtualization-based resource pool.

5. The method of claim 1, wherein determining the resource template comprises determining hardware configuration data and software configuration data corresponding to the computing environment.

6. A system, comprising:
   a processor unit; and
   a management application executable by the processor unit to dynamically allocate virtualization-based resources for resolving a problem report associated with a computing environment, the management application configured to:
   receive the problem report;
   determine a resource template from the problem report corresponding to the computing environment;
   determine whether a virtual machine is available from a virtualization-based resource pool based on the resource template;
   responsive to determining that a virtual machine is not available from the virtualization-based resource pool based on the resource template, identify optional resource attributes based on the problem report, the optional resource attributes indicating resources of the computing environment unnecessary for resolving a problem indicated by the problem report;
   determine whether a virtual machine is available from the virtualization-based resource pool without the optional resource attributes;
   responsive to determining that a virtual machine is available from the virtualization-based resource pool based on the resource template without the optional resource attributes, utilize the virtual machine as a re-create environment for resolving the problem report;
   determine whether to start the virtual machine based on an age and a severity of a problem indicated by the problem report; and
   responsive to the severity of the problem indicated by the problem report, suspend or re-allocate various virtualization-based resources currently active for resolving a different problem report if enough resources are not available to start the virtual machine for the problem report.

7. The system of claim 6, wherein the management application is further configured to, responsive to determining that a virtual machine is not available from the virtualization-based resource pool based on the resource template:

identify replaceable resource attributes of the resource template; and determine whether a virtual machine is available from the virtualization-based resource pool based on the replaceable resource attributes.

8. The system of claim 6, wherein the management application is further configured to, responsive to determining that a virtual machine is not available from the virtualization-based resource pool based on the resource template:

determine whether the virtualization-based resource pool comprises resources corresponding to the resource template; and responsive to determining that the virtualization-based resource pool comprises resources corresponding to the resource template, create a virtual machine from the virtualization-based resource pool based on the resource template.

9. The system of claim 8, wherein the management application is further configured to:

responsive to resolving the problem report, determine whether the created virtual machine comprises a reusable virtual machine; and responsive to determining that the created virtual machine comprises a reusable virtual machine, add the created virtual machine to the virtualization-based resource pool.

10. The system of claim 9, wherein the management application is configured to determine hardware configuration data and software configuration data corresponding to the computing environment to define the resource template.

11. A computer program product for allocating virtualization-based resources for resolving a problem report associated with a computing environment, the computer program product comprising:

a non-transitory computer readable medium having computer readable program code embodied therewith, the computer readable program code comprising computer readable program code configured to:

receive the problem report;

determine a resource template from the problem report corresponding to the computing environment;

determine whether a virtual machine is available from a virtualization-based resource pool based on the resource template;

responsive to determining that a virtual machine is not available from the virtualization-based resource pool based on the resource template, identify optional resource attributes based on the problem report, the optional resource attributes indicating resources of the computing environment unnecessary for resolving a problem indicated by the problem report;

determine whether a virtual machine is available from the virtualization-based resource pool without the optional resource attributes;

responsive to determining that a virtual machine is available from the virtualization-based resource pool based on the resource template without the optional resource attributes, utilize the virtual machine as a re-create environment for resolving the problem report;

determine whether to start the virtual machine based on an age and a severity of a problem indicated by the problem report; and responsive to the severity of the problem indicated by the problem report, suspend or re-allocate various virtualization-based resources currently active for resolving a different problem report if enough resources are not available to start the virtual machine for the problem report.

12. The computer program product of claim 11, wherein the computer readable program code is configured to, responsive to determining that a virtual machine is not available from the virtualization-based resource pool based on the resource template:

identify replaceable resource attributes of the resource template; and determine whether a virtual machine is available from the virtualization-based resource pool based on the replaceable resource attributes.

13. The computer program product of claim 11, wherein the computer readable program code is configured to, responsive to determining that a virtual machine is not available from the virtualization-based resource pool based on the resource template:

determine whether the virtualization-based resource pool comprises resources corresponding to the resource template; and responsive to determining that the virtualization-based resource pool comprises resources corresponding to the resource template, create a virtual machine from the virtualization-based resource pool based on the resource template.

14. The computer program product of claim 11, wherein the computer readable program code is configured to:

responsive to resolving the problem report, determine whether the created virtual machine comprises a reusable virtual machine; and responsive to determining that the created virtual machine comprises a reusable virtual machine, add the created virtual machine to the virtualization-based resource pool.

* * * * *